INVENTORS
John E. Larsen,
Marion W. Sims,
BY John M. Stoudt
Attorney.

Inventors:
John E. Larsen,
Marion W. Sims,
by John M. Stoudt
Attorney.

United States Patent Office 3,421,208
Patented Jan. 14, 1969

3,421,208
METHODS FOR SEPARATING ELECTRICALLY
CONDUCTIVE AND ADJACENT ELEMENTS
John E. Larsen and Marion W. Sims, Fort Wayne, Ind.,
assignors to General Electric Company, a corporation
of New York
Filed Jan. 21, 1965, Ser. No. 426,933
U.S. Cl. 29—609                                                 7 Claims
Int. Cl. H01f 3/04; H01f 7/06

ABSTRACT OF THE DISCLOSURE

A method substantially or completely separates a number of magnetic elements, such as magnetic laminations at least temporarily held together by a laminate bond existing between next adjacent laminations as might occur, for example, from subjecting the laminations to an annealing operation. The stuck-together laminations are surrounded by electrical conductors in which at least one electrical energy surge is generated of a magnitude sufficiently great to achieve their desired substantial or complete separation. This surge creates a varying magnetic field distributed around the periphery of the laminations and electromagnetic forces which act upon the laminations to break the interlaminate bonds. Thereafter, the elements, if laminations, may be aligned and secured together to form a core for use in electrical inductive device. Where laminations have already been secured together to form a core and interlaminate bonds might exist between next adjacent laminations, at least one electrical energy surge may be generated in the electrical conductors which surround the laminated core. The surge produces a varying magnetic field and resultant magnetic forces distributed around the outer regions of the core which interact with the individual laminations to reduce electrical losses in the core by destroying the effectiveness of the interlaminate bond. These methods permit the use of the same type of equipment with structures having a variety of configurations, and with specific reference to stator laminations, inherently weak tooth portions will not tend to be deformed or flared in spite of the relatively high electromagnetic forces which may be employed during the practice of the methods.

---

The present invention relates generally to improved methods for separating a number of adjacent, electrically conductive, elements a desired amount. More particularly, our invention provides an improved method for at least partially separating individual magnetic core elements in the form of laminations, initially bonded together in stacked relation. In addition, an improved method for reducing the interlaminate core loss is provided for laminated cores fabricated of magnetic material.

In the manufacture of magnetic cores for electrical inductive devices, such as dynamoelectric machines, transformers, electromagnetic switches, and the like, it is customary to form the cores from a preselected number of relatively thin magnetic laminations held together in stacked relation. These laminations are normally stamped or punched into the desired configuration from sheet material; e.g., steel or iron, stacked in accurately aligned relation to furnish a core of preselected length, and then secured together while retained in the aligned relation by welding, keying, etc.

In order to relieve the laminations of internal stresses which may have been set up in the metal by the stamping operation and for other well-known reasons (e.g., preparation for subsequent machining or cold-working, if any) generally speaking, the laminations are annealed either before the stacking step or after the securing step mentioned above, whichever is the more convenient approach for the type of lamination and the kind of securement involved.

While the foregoing manufacturing annealing practices do result in the alleviation to a great degree of the stress relief problem, unfortunately, they raise other problems. For example, for those situations in which the laminations are annealed prior to the final alignment and securement steps, the laminations are usually subjected to an annealing temperature while disposed vertically in a random stacked reation. During anneal, an interlaminate metallic bond is created between next adjacent laminations, causing them to stick together, which in turn, interferes with their subsequent final alignment. It is believed that this sticking together or interlaminate bond is due, at least in part, to oxides formed during anneal on the next adjacent lamination surfaces.

In other situations, such as the fabrication of a laminated dynamoelectric machine stator core member illustrated in U.S. Patent No. 2,448,785 of L. M. Dolan, granted Sept. 7, 1948, it is desirable to stress relieve the laminations after the laminations have been aligned and secured together, e.g., welded construction. This approach also compensates for internal stresses which might have been created during the securement or welding operation. Unfortunately, here again, a metallic interlaminate bond is produced, probably an oxide, between laminations which tends to join next adjacent laminations firmly together. As far as we can determine, whatever the cause, this bond, among other things, produces undesirable eddy currents at those interlaminate bonded locations during subsequent electrical use of the core in the electrical inductive device and a resulting so-called "core loss," which adversely affects the ultimate possible output of the inductive device.

The interlaminate bond problem is troublesome for another reason. In the production of certain kinds of dynamoelectric machine cores, after the laminations have been aligned and held firmly together in stacked relation, a thin film of unhardened thermoresponsive adhesive coating and insulating material, like thixotropic epoxy resin, is applied between next adjacent laminations. The material penetrates between the laminations by capillary action and upon hardening, the coating material assists in securing the laminations into a rigid core. U.S. Patent 2,978,371 issued to Nick Baciu on Apr. 4, 1961 is illustrative of this approach. When cores include the interlaminate metallic bond previously discussed, the proper penetrating insulating, and bonding functions of the coating material are interfered with by the bond.

In an effort to break the interlaminate bond resulting from anneal for the above and other reasons, it has therefore become accepted manufacturing procedure to subject the stuck together laminations to an impact force. Such procedures normally include the striking of the lamination peripheries by mallets or the like, dropping the stuck together laminations onto a hard surface from a predetermined height, mechanically separating the laminations by blades which enter between adjacent laminations, and lamination vibrating techniques. None of these procedures have been entirely satisfactory to date. Not only are the procedures somewhat expensive to practice from the standpoint of labor and equipment required, but in addition, there is a tendency for the laminations to become adversely affected. For example, in stator laminations having a number of tooth sections terminating in a center rotor receiving bore, the tooth sections may become deformed to the extent that the laminations must be entirely discarded, thus increasing the over-all expense to manufacture the cores. Moreover, regardless of the impact forces involved, there is no guarantee that the interlaminate bond will be sufficiently destroyed.

Accordingly, a primary object of the present invention is the provision of an improved method of separating a number of adjacent electrically conductive elements a desired amount and it is a more specific object to provide an improved method for separating to a selected degree next adjacent magnetic laminations, whether or not secured together in stacked relation to form a core, which is easy and inexpensive to practice, yet does not damage the laminations to the extent that they must be discarded.

It is another object of the present invention to provide an improved and easily practiced method for breaking interlaminate bonds a desired amount, occurring between next adjacent magnetic core laminations, in a readily controlled and efficient manner without restoring to the use of mechanical impact forces on the laminations in an attempt to destroy such bonds.

It is yet another object of the present invention to provide an improved method for reducing core losses in a laminated magnetic core normally resulting from interlaminate bonding of the laminations as might occur, for example, from an annealing step in the fabrication of the core.

By one aspect of the present invention, we provide a method for completely separating a number of elements such as magnetic laminations held together in adjacent relation primarily by a laminate bond extending between adjacent laminations which is formed, for instance, during anneal of the laminations. In one form, we surround the stuck together laminations with electrical conductor means for conducting electrical energy and generate at least one electrical energy surge in that means of a magnitude sufficiently great to achieve the desired complete separation of laminations. This surge of electrical energy creates a varying magnetic field distributed entirely around the periphery of the stuck together laminations which, in turn, produces electromagnetic forces to act upon the laminations. These electromagnetic forces interact with the individual laminations, breaking the interlaminate bonds and effecting substantial, if not complete separation of the next adjacent laminations relative to one another.

By a further aspect of the present invention, we also achieve a reduction in electrical core loss in the core in use in an electrical inductive device fabricated from a number of magnetic laminations rigidly secured together in stacked relation and having an interlaminate bond between at least some of the next adjacent laminations. Here again, we surround the laminations with an electrical conductive means and generate at least one electrical energy surge in that means. Its magnitude is selected to produce the desired electrical loss reduction without damaging the rigid securement of the core and of the laminations themselves. The electrical energy surge produces a varying magnetic field and resultant electromagnetic forces distributed around the outer regions of the core which interact with the individual laminations to adversely affect or break the interlaminate bonds and reduce electrical loss in the core arising from such bonds.

The present invention not only provides efficient and effective methods for achieving the above results but also obtains the desired results by procedures which are readily controlled and easily practiced. In addition, the magnitude of the electromagnetic forces permitted by our invention is relatively high and the type of elements which may be separated may be quite varied in structure and configuration, the procedure being quite versatile in nature. Moreover, with specific reference to stator laminations, the inherently weak tooth portions will not become deformed or flared in spite of the relatively high electromagnetic forces which may be employed in the separation of the individual laminations. For those applications which require coating insulation material to be applied between next adjacent laminations, the laminations of the core can be readily separated a predetermined amount to provide a path for the proper penetration of such material.

The subject matter which we regard as our invention is particularly pointed out and distinctly claimed in the concluding portion of this specification. Our invention, itself, however, both as to its organization and method of operation, together with further objections and advantages thereof may best be understood by reference to the following description taken in connection with the accompanying drawing in which:

Figure 1:
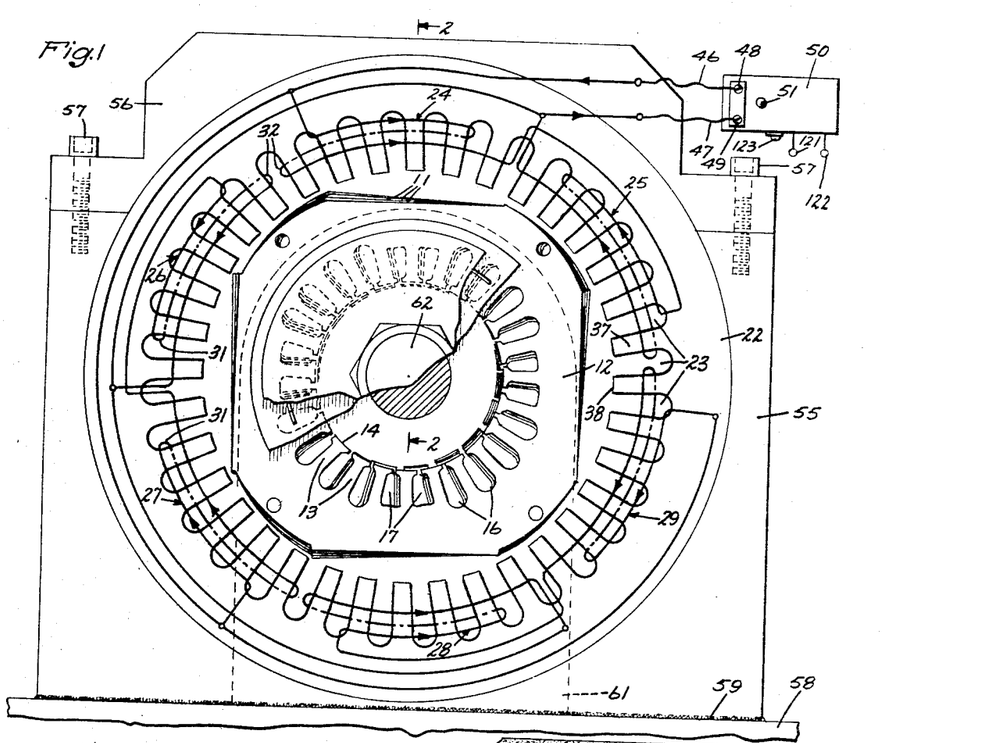
FIGURE 1 is an end elevational view of stuck together stator laminations formed of magnetic sheet material and the equipment, partially shown in schematic form, including electromagnetic force producing apparatus having an excitation winding, with the winding being connected in circuit to an energy surge source which may be employed in the practice of our invention, to completely separate the laminations in the exemplification.
Figures 2, 3:
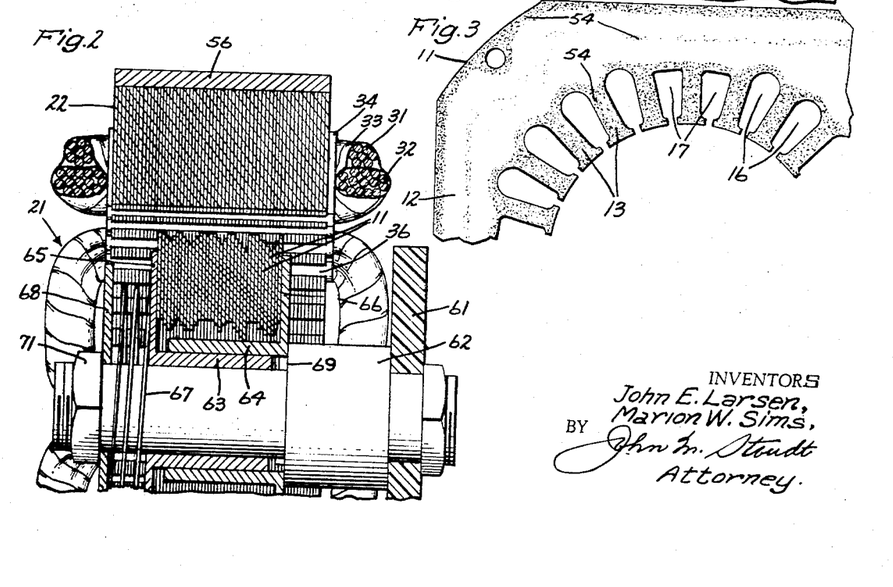
FIGURE 2, is a sectional view taken along line 2–2 of FIGURE 1.
FIGURE 3 is an enlarged fragmentary view of a single lamination illustrated in FIGURES 1 and 2 which has been separated from the remainder of the laminations by one form of our method.

Having more specific reference to FIGURES 1, 2 and 3 we have illustrated various aspects of one form of our invention as applied to the complete separation of a number of substantially identical stator laminations 11, each having a generally square outline which are stuck together in face to face relation in a somewhat random fashion. The illustrated laminations are of the type for use in the stator members disclosed by Chester A. Smith in his U.S. Patent Nos. 2,812,459 and 3,062,978 respectively issued Nov. 5, 1957 and Nov. 6, 1962. Each lamination includes an outer yoke portion 12 and angularly spaced apart tooth portions 13 which have inner lips defining a rotor receiving bore 14. The plurality of tooth portions, twenty-four being shown, also provide a corresponding number of winding accommodating slots 16, 17 with former numeral denoting deep slots located at each corner of the laminations and the latter designating shallow slots at each lamination side.

In the fabrication of laminations of the first exemplification, before one form of our method has been carried out on them, they are initially punched or otherwise severed from relatively thin magnetic sheet material, such as 0.025 inch iron stock, and a number of the laminations are then placed in the face to face vertical stacked relation for the furnace anneal treatment in an atmosphere between 810–890 degrees centigrade for a period of about four hours. Upon completion of the anneal cycle, including a cooling step, the laminations in each stack are firmly stuck together in the relative positions they assumed during anneal. It is believed as already suggested, that oxide or an interlaminate metallic bond is formed between next adjacent laminations during anneal which holds them together in this manner.

In order to effect complete separation of laminations 11 and break the interlaminate bonds, we prefer to establish an electromagnetic field distributed entirely around the outer edges or periphery of the laminations in the region of yoke portions 12, away from the structurally weaker tooth portions 13. This may be accomplished by the equipment revealed in FIGURES 1 and 2 which has actually been used in the practice of our invention. By way of example, an excitation winding 21 is supported in the vicinity of the peripheral lamination edges by a rigid winding accommodating member 22 having winding receiving slots 23. The winding includes six similar coil groups 24–29 inclusive formed of two coils 31, 32, each, the coil groups defining six magnetic poles of alternating polarity surrounding the laminations. That is, the winding groups are arranged on member 22 such that the current flow in adjacent coil groups is in opposed directions, as indicated schematically by the arrows in FIGURE 1.

In the winding arrangement actually used, coils 31 and 32 were respectively comprised of seven and fourteen turns of stranded, enameled copper wire. Each wire consisted of five strands with an overall nominal diameter of .0403 inch for the individual strands. The coils were wrapped within insulating tape 33 (FIGURE 2) to provide rigidity and insulated from member 22 by standard insulating slot liners 34. The usual wedges 36 were employed in the slots 24 at the bore. Although the coils were not embedded in insulating material, such as epoxy resin to hold them completely fixed relative to member 22, such could be done for best results. Member 22 included thirty-six slots 23 and was constructed of aligned magnetic laminations in a three inch stack provided with the illustrated configuration. The member thus was formed with inwardly extending magnetic projections 37 terminating in a central cylindrical opening or bore 38, six inches in diameter, which extended entirely through the member in an axial direction. Pairs of adjacent poles were serially connected: 24, 25; 26, 27; and 28, 29; and the three pairs were connected through leads 46, 47 across output terminals 48, 49 of a suitable energy surge source 50, capable of supplying an electrical energy surge of selected magnitude to excitation winding 21. It is believed that with the coil groups of winding 21 connected in this circuit relation, the impedance of the energy source 50 of a specific exemplification to be outlined below may be nearly matched and approximately the same voltage build-up can be provided at each of the magnetic poles during the practice of our invention to furnish a somewhat uniform distribution of flux around the periphery of laminations 11.

As will be explained in detail hereinafter, depression of pushbutton switch 51 actuates a circuit for charging the capacitor bank to a selected voltage level which is regulated by a variable autotransformer. After a short period of time, the capacitor bank is discharged and a surge of electrical energy as controlled by the voltage level on the capacitor bank is injected into winding 21 across output terminal connectors 48 and 49.

The application of the energy surge to winding 21 produces a current flow through the individual turns of coils 31, 32 and establishes a varying electromagnetic field distributed entirely around the periphery of laminations 11. This action produces electromagnetic forces of relatively high strengths in the regions of the laminations disposed next to winding 21 and magnetic member 22, with the forces and magnetic laminations 11 interacting to break the interlaminate bonds between next adjacent laminations and to completely separate laminations 11 one from the other.

FIGURE 3 depicts a fragmentary side face of a lamination actually separated in the above described manner. It is believed that the portions shown by the dark shading on the side face of the illustrated lamination fragment and identified in FIGURE 3 by numeral 54 are remnants of the broken interlaminate bond. This bond appeared along both the outer and inner peripheral regions of the lamination side face as well as in the central region extending through the yoke portion 12 between the lamination edges.

The preselected electrical energy magnitude mentioned above in connection with the surge should, of course, be of sufficient intensity to accomplish the desired complete separation but must be below the intensity at which the planar structure of the laminations will be deleteriously affected or distorted. It will be obvious to those skilled in the art that the total number of surges to be employed and the preselected surge magnitude chosen for a given application to produce a force level sufficiently high to effect the desired lamination separation are dependent upon several variable factors. Among these are the exact overall configuration, stiffness, elastic limit, and composition of the elements being separated, the strength of the bond joining the next adjacent elements together, and the relative proximity of the electrical conductor means to the elements. The magnitude of the energy surge to be applied in a particular application can be best determined by applying surges of different levels, starting at a low energy surge level and successively raising the level in gradual increments until the desired results are accomplished.

To support the electrical conducting means and stuck together laminations 11 in temporarily fixed relative positions and to prevent the laminations from being propelled outwardly from the confines of opening 38 in winding accommodating member 22, the apparatus revealed in FIGURE 2 may be utilized. The winding accommodating member as illustrated is rigidly held in a cradle bracket 55 by a clamping bracket 56 removably fastened to the cradle bracket by a pair of screws 57. A cradle bracket 55 is mounted in an upright position onto a base plate 58 by welds 59.

An upright wall 61 formed of insulating material is also mounted onto base plate 58 by screws (not shown) axially spaced from bracket 55 to allow room for receiving the coils of winding 21 as shown in FIGURE 2. A stud 62, threaded at each end, is in turn, carried by upright wall 61 in the manner also shown in FIGURE 2 and mounts a pair of telescoping tubular elements 63, 64, each formed with annular radial flanges 65, 66 respectively for engagement with the outer side faces of the end laminations 11 in the stuck together stack. Flanges 65, 66 of these elements are biased against the associated lamination side faces by a suitable helical spring 67 and washer 68, the components being held in assembled relation between raised shoulder 69 of stud 62 and nut 71, which is threadably received at one end of stud 62 and frictionally engages the outside surface of washer 68. Thus, during the complete separation of laminations 11, the spring 67 becomes depressed and permits axial expansion of the telescoping elements. At the same time, the flanges act to confine the laminations within opening 38 and prevent their propulsion beyond the axial extremities of the opening thereby permitting use of successive energy surges, if such is desired, without the necessity for repositioning any stuck together laminations back into member 22.

The following example is given in order to show more clearly how the method as described above for the exemplification of laminations 11 has been carried forth in actual practice. Each lamination was constructed with the configuration illustrated in FIGURE 1 and included the following nominal dimensions:

Distance across from side edge to side edge
inches__ 4.80
Diameter across the corners, edge to edge __do____ 5.49
Width of each tooth portion ____________do____ 0.162
Gross slot area ________________square inches__ 0.269
Lamination thickness __________________inches__ 0.025

These laminations were placed in stacks of approximately one inch in height and annealed as already described. The capacitor bank having a capacitance of 800 microfarads, was charged for twenty-five seconds at a selected voltage of 2,500 volts and delivered an energy surge of 2,500 joules to winding 21. This energy level was sufficiently high to effect the desired complete separation of the stacked laminations without detrimentally affecting the individual laminations.

It was found by experimentation that in order to insure complete separation of the example laminations, the axial length of member 22 and the coil sides of winding 21 should be greater than the axial length of stuck together laminations, and preferably, should be at least one and one half times as great in order to derive the maximum force level benefits for a given energy surge supplied to winding 21 of the exemplification.

Figures 4, 5:
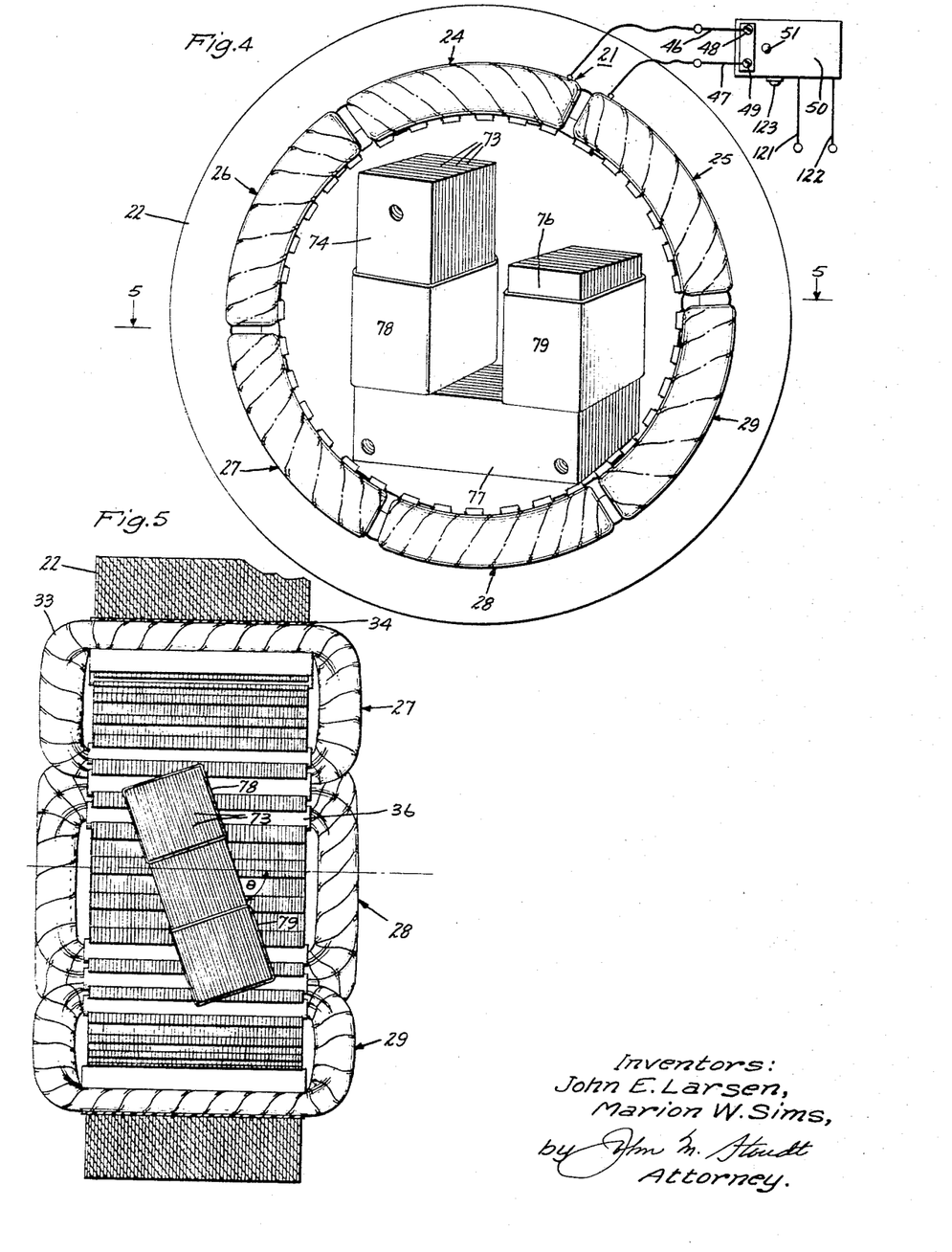
FIGURE 4 is an end elevational view of the winding apparatus of FIGURE 1 connected to the energy surge source, revealing our invention completely separating stuck together transformer laminations.
FIGURE 5 is a sectional view taken along line 5—5 in FIGURE 4.

With respect to FIGURES 4 and 5, we have shown the same electrical conductor means and energy surge source already described in connection with FIGURES 1 and 2 and, therefore, like reference numerals are used in the latter two figures to identify like parts described before with regard to FIGURES 1 and 2. The equipment is used in FIGURES 4 and 5 to separate completely a stack of stuck-together electrical conductive elements in the form of identical transformer laminations 73. In the exemplification, each lamination is generally U-shaped, stamped from suitable magnetic sheet stock like silicon steel and comprises a long leg portion 74 and a shorter leg portion 76, integrally joined together at one end by a bight portion 77.

These laminations, for purposes of illustration, have been annealed as already mentioned in reference to laminations 11. Enlarged bands 78 and 79 are slid over the respective leg portions 74, 76 to encircle the associated leg portions and prevent the propulsion of the laminations as they are being separated by our invention. To obtain the maximum force level for a given energy surge using the illustrated equipment, it has been found by experimentation that the center of the bight portion of the laminations should be located somewhat near the radial center of one of the coil group poles, with bight portion generally transversing the pole in the manner shown in FIGURE 4. In addition, side faces of the stack should be located at an angle $\theta$ measured between the side face and the axis of the opening 38 in the fashion revealed in FIGURE 5. The most advantageous angle is dependent upon the exact construction of the laminations.

The interlaminate bond joining next adjacent laminations 73 together resulting from the anneal treatment is broken and the laminations completely separated by the same step by step procedure outlined in connection with the separation of stator laminations 11. The magnitude of the energy surge for best results, is related to the same factors already discussed in connection with stator laminations 11 of the first three figures. By way of exemplification, for separating stuck together transformer laminations fabricated with the illustrated configuration, the stuck together laminations were disposed within opening 38 of member 22 constructed as shown, with angle $\theta$ being in the neighborhood of 70 degrees. A capacitor bank of 615 microfarads was charged to 4000 volts in twenty seconds to produce 4920 joules of energy. The capacitor bank was then discharged to winding coil groups 24–29 inclusive and all of the laminations were satisfactorily separated one from the other. The laminations had the following nominal dimensions:

| | Inches |
|---|---|
| Lamination thickness | 0.025 |
| Width of leg portions 74, 76 | 1.250 |
| Width of bight portion 77 | 1.188 |
| Outer edge longitudinal dimension, leg portion 74 | 5.125 |
| Outer edge longitudinal dimension, leg portion 76 | 3.938 |
| Edge to edge length of bight portion 77 | 3.750 |

The same energy and voltage levels mentioned above were employed for the complete separation of laminations stacked in lengths varying from 0.875 inch to about 1.250 inches and in each case, satisfactory separation was achieved without damage incurred to the individual laminations.

It will be seen from the foregoing discussion that the advantageous features of this aspect of our invention are numerous. We can obtain complete separation of magnetic elements without the use of mechanically applied impact forces against the outer surfaces of the elements which would normally tend to bend or otherwise deform the surfaces with which contact is made. Moreover, it is possible to control the force level we employ and in the practice of the preferred embodiment, to distribute the forces entirely around the outer regions of the elements to obtain unusually high and satisfactory force levels for a given application without damaging the elements. However, it is not intended that our method be limited to the use of the illustrated equipment nor to the electrical conductor means of the exemplification. For those types of elements, like certain stator laminations, having an opening through them and where their elastic limits and inherent strengths permit, it may be convenient to employ an electrical conductor or winding both in the bore as well as around the outside as illustrated and simultaneously apply an energy surge to both windings to effect the desired separation. The types of elements which may be separated by our invention is quite varied and satisfactory results may be achieved both effectively and efficiently in an inexpensive and rapid fashion.

Figure 6:
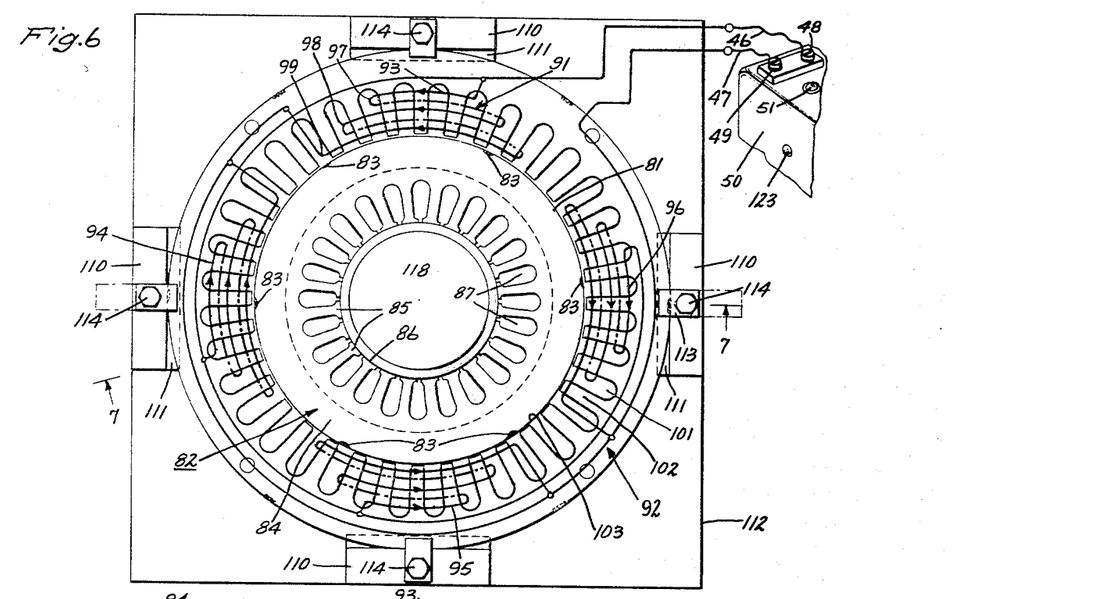
FIGURE 6 is a plan view, partially schematic, showing another aspect of our method employed to separate stator laminations secured together in stacked relation a selected amount and the type of apparatus which may be utilized in the practice of our invention.
Figure 7:
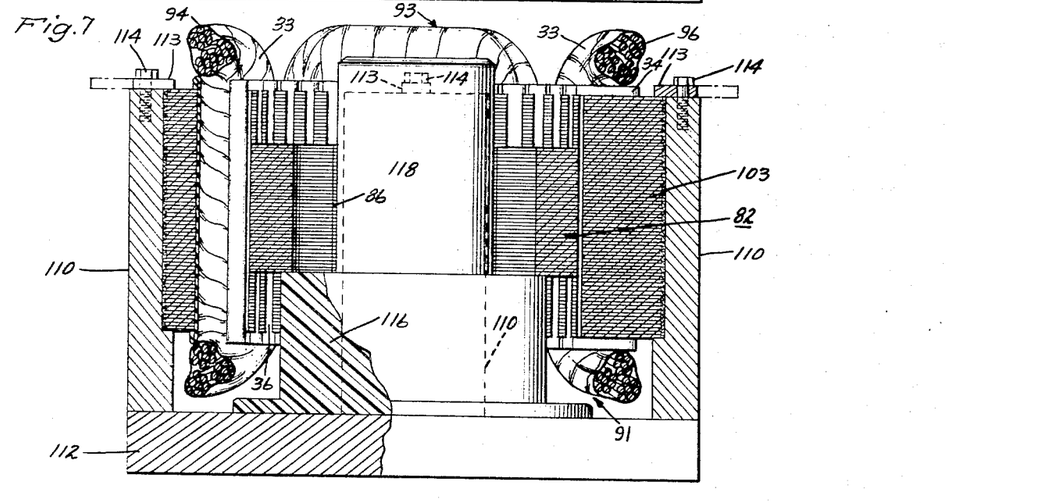
FIGURE 7 is a sectional view taken along line 7—7 in FIGURE 6, with the winding portion of the apparatus being seen as provided in actual practice.

Turning now to a consideration of FIGURES 6 and 7, we have disclosed another aspect of our invention as applied to the slight separation of next adjacent magnetic laminations 81 secured together in stacked relation to form a laminated core 82, which in the exemplification has been annealed with the resulting interlaminate bonds existing between at least some of the next adjacent laminations. A number of welds 83 extend transversely across the outer periphery of the core at six angularly spaced positions to secure the laminations together in stacked, face to face, relation. Consequently, in the exemplification of FIGURES 6 and 7, our method is used to provide relative movement and slight separation of next adjacent laminations to break the effectiveness of these bonds and to reduce electrical core losses primarily resulting from such bonds. Core 82 is of the type to be incorporated in a stator member for use in an electric motor and has the stacked laminations aligned to provide yoke and tooth sections 84, 85, a central bore 86, and twenty-four accommodating slots 87.

With respect to the illustrated electrical conductor means of this embodiment, it is in the form of a winding 91 carried by a laminated winding accommodating member 92 fabricated of magnetic material. The winding 91 includes four coil groups 93–96 to provide a corresponding number of magnetic poles, with adjacent poles being of opposite polarity. Each of the coil groups is defined by three concentric windings 97, 98, 99 arranged in suitable slots 101 of member 92. Each of the three coils in a single coil group spans a different number of inwardly extending magnetic projections 102 which together provide a central opening 103 entirely through member 92. In actual practice, winding 91 and member 92 were provided as shown in FIGURES 6 and 7 and each coil group was in parallel with one another, connected by leads 46, 47 across terminal connectors 48, 49 of energy surge source 50. In addition, each coil was formed of seven turns of copper wire, having insulating tape 33 wound around the turns for the reasons given in regard to winding 21.

With core 82 being maintained within opening 86 and encircled by the four coil groups of winding 91 in the vicinity of the outer periphery of the core, an energy surge of preselected magnitude is applied to winding 91. The magnitude should be below that which will damage either the securement of the laminations in stacked relation, e.g., the six welds 83 in the exemplification, or distort the somewhat planar structure of the individual laminations beyond that which would force the core to be discarded. In addition, the magnitude should be sufficiently high to effect the desired results. Of course, one or more successive energy surges of increasing magnitudes may be injected into winding 91 for this purpose.

The energy surge is applied to winding 91 by depressing the pushbutton switch 51 and, as before, the capacitor bank is charged to the selected voltage level and thereafter discharged in the form of an electrical surge of energy to winding 91. This creates a current flow in the coil groups, for instance, in a direction indicated by the arrows in FIGURE 6 to produce a varying electromagnetic field entirely surrounding the outer regions of the core. As a result, electromagnetic forces are created in the regions of the core next to winding 91 and member 92, the higher intensity forces being disposed away from the structurally weak tooth sections of the core. These forces interact with the laminations to break the interlaminate bond, if any, to separate the next adjacent laminations slightly one from the other except at the locations of their securement, and to effect a reduction of the electrical losses in the core.

This aspect of the present invention may possibly be better understood by the following example which shows how one form of our invention, as described above, has been carried out in actual practice. Several cores were constructed with laminations having the configurations and securement illustrated in FIGURE 6 and with the following nominal dimensions:

| | |
|---|---|
| Lamination thickness | inches 0.025 |
| Stack height | do 2.000 |
| Outer diameter | do 5.490 |
| Bore diameter | do 2.650 |
| Gross winding slot area | square inches 0.1558 |
| Tooth section width | inches 0.1778 |

These cores were annealed between 800 and 890 degrees centigrade for about four hours and then cooled to ambient room conditions; e.g., 25 degrees centigrade.

The following typical results for one of the tested cores is representative of the benefits which may be achieved by our invention. After the example core was annealed and cooled, it had an electrical core loss of 16.4 watts at eight volts measured by the so-callde "Wattmeter" or comparative watts test technique. Two toroidal coils with 32 and 64 wire turns were wound through the bore 86 and over the yoke section 84, circumferentially around core 82. The first coil was connected to the current coil of the wattmeter and the second one to the potential coil of the same meter. Alternating current, passed through the first coil, produced magnetic flux in the core which was sensed by the second coil to provide a reading on the wattmeter indicative of the electrical losses in the core under the test conditions. Energy surge source 50, having a capacitor bank rated at 320 microfarads, was charged to a voltage level of 1500 volts and thereafter 360 joules were discharged to winding 91 arranged relative to core 82 in the manner revealed in FIGURES 6 and 7. This cycle was repeated at the same energy level and a measurement taken at 8 volts which indicated a total electrical loss of 14.8 watts for the core.

Successive energy surges of 640 and 3240 joules (2,000 and 4,500 volts respectively) were then applied to winding 91, resulting in a final electrical loss reduction to 3.9 watts at eight volts for the core, a total reduction of 12.5 watts. Even at the upper energy level, the six welds across the outer periphery of the core were intact and served to hold the laminations in stacked relation. The laminations were also still axially aligned as determined by visual observation. Although there was a slight perceptible separation of the laminations and the effectiveness of the interlaminate bonds appeared to be considerably diminished, if not entirely destroyed, the separation achieved was not great enough, at either the welds or tooth sections, to prevent the satisfactory subsequent utilization of the cores in stator members.

As is evident from the above discussion of the embodiment illustrated in FIGURES 6 and 7 and the specific example, it is possible by our method to effect quite a significant reduction in the electrical losses of a magnetic core for use in electrical inductive devices. It is also practical to attain the desired slight separation of next adjacent laminations in a core without an accompanying destruction of the means for securing the laminations together. The extent of the separation may be readily regulated to permit penetration, as by capillary action, of a thin film of unhardened epoxy resin insulating and coating material or its equivalent for insulating and bonding purposes.

Returning now to FIGURES 6 and 7, one possible arrangement is illustrated for maintaining the temporarily fixed relation between the electrical conductor means and core 82 of the exemplification. Member 92 is shown supported with the axis of its opening 103 disposed vertically by four angularly spaced apart upright posts 110 each having a shoulder 111 engaging the lower end of the member to achieve this end. These upright posts are mounted to a base plate 112 such that there is sufficient space for accommodating the end turns of the coil groups in the fashion seen in FIGURE 7 above to the upper surface of base plate 112. Each post swingably mounts a locking piece 113 by screw 114 to allow assembly of member 92 onto the supporting posts. A central plug 116 of insulating material extends upwardly into the opening 103 of member 92 and the bottom face of core 82, as viewed in FIGURE 7, rests on a horizontal shoulder 117 to center the core axially within bore 86. A central cylinder 118 of reduced size is received in the bore of the core to assist in centering the core in a radial direction.

Figure 8:
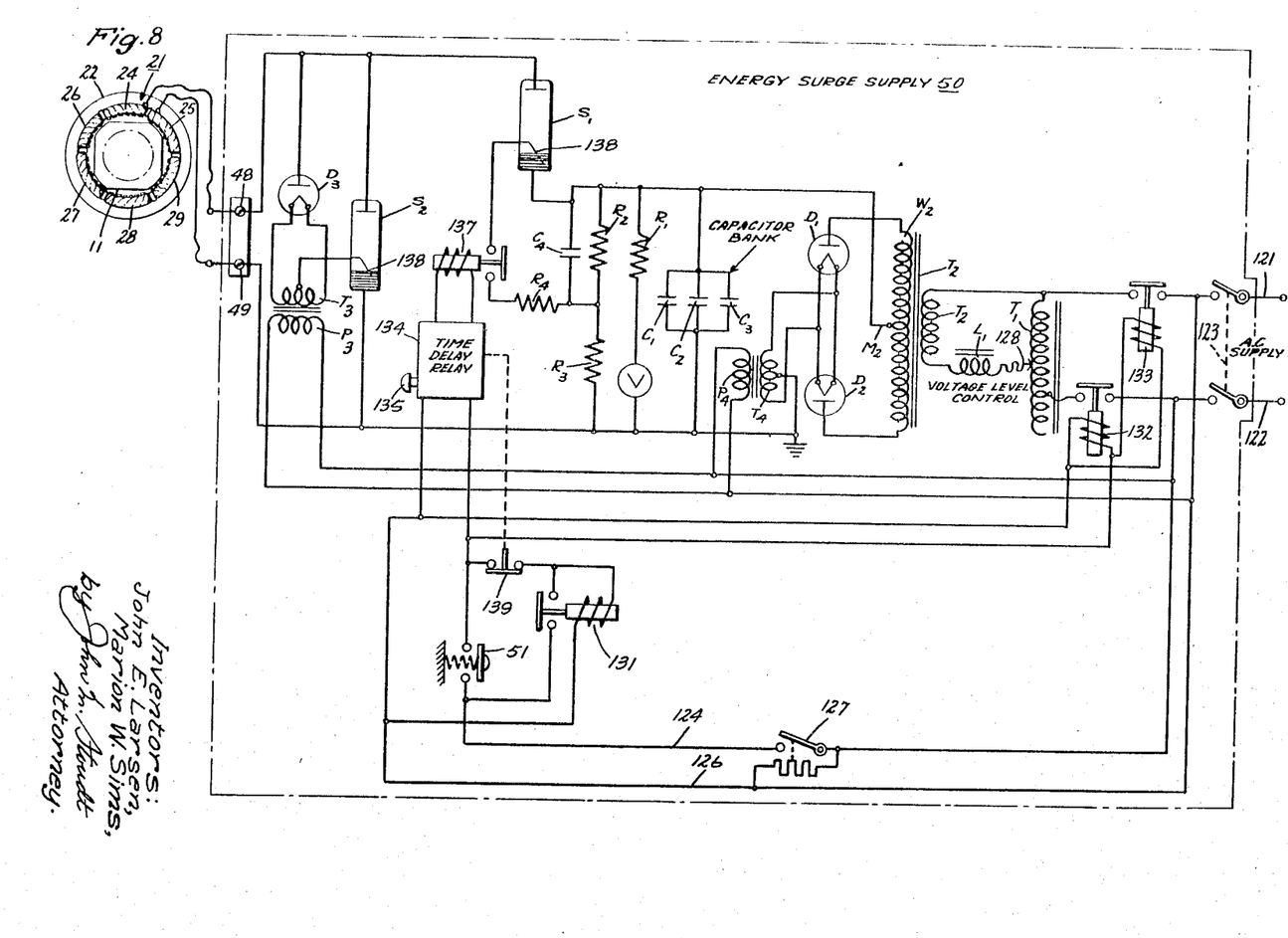
FIGURE 8 is a schemaic circuit diagram of an energy surge supply adapted to produce a high energy surge for carrying out the steps of our invention.

FIGURE 8 displays a simplified circuit diagram of one type of electrical energy surge source which may be used in the practice of the present invention. This source is shown in block form and identified by numeral 50 in the previously described figures. By way of illustration, the source includes a bank of three parallel connected storage capacitors $C_1$, $C_2$, and $C_3$ chargeable as a unit to various regulated voltage levels, and are subsequently discharged to provide a high electrical energy surge of preselected magnitude by switching an ignitron $S_1$ into conduction. The components of the circuit may be mounted in a housing or casing (not shown) for convenience and connected to a suitable alternating current supply, such as the well-known commercially available 120 volt, 60 cycle through input terminals 121, 122 which in the actual circuit consisted of a plug for use with a grounded type of receptacle. A main on-off switch 123 of standard construction is provided to initially energize certain components of the circuit. It will be observed from FIGURE 8 that with switch 123 in the closed position, primary windings $P_3$, $P_4$ of the filament transformers $T_3$, $T_4$ are immediately activated. It will also be seen that the circuit which includes pushbutton switch 51 and leads 124, 126 is not originally energized until after an interval of time as determined by thermostatic time delay switch 127. In this way, the grids of the rectifier tubes $D_1$, $D_2$ and $D_3$ are allowed to warm up for at least 30 seconds before plate voltage is applied to the rectifier tubes, which are of the liquid vapor type, necessitating the warm-up period.

In order to regulate the voltage level on the bank of capacitors $C_1$, $C_2$, $C_3$, adjustable arm 128 of the autotransformer $T_1$ is movable for regulating the voltage to the desired level. In the application of this energy source to our invention, the magnitude of the high energy surge provided in the individual exemplifications, winding 21 being shown connected to the output terminal connectors 48, 49 in FIGURE 8, may be readily selected by controlling or regulating the voltage level which the capacitors $C_1$, $C_2$, and $C_3$ are charged.

As previously noted, the charging of the capacitor bank is initiated by depression of pushbutton switch 51. This momentary closing of switch 51 causes the normally open relay 131 to close, whereupon the coils of the two normally closed relays 132 and 133 are also energized for supplying alternating current across the autotransformer $T_1$. When relay 131 closes, time delay relay 124 is also actuated and after a time delay determined by the setting on the control 135, relay 137 is operated to provide a positive potential applied at starter rod 138 of ignitron $S_1$ which is then switched to a conductive state. Ignitrons $S_1$ and $S_2$ illustrated in the circuit are mercury-pool cathode-arc rectifiers with a starter rod immersed in the mercury pool. When a positive potential is supplied at the starter rod of the ignitrons, sparking occurs at the junction of the rod and mercury pool causing the formation of a cathode spot, with the anode passing current in the usual way.

With ignitron $S_1$ in a conductive state, time delay relay 124 momentarily opens and contacts 139 to restore relays 131, 132 and 133 to their normally open positions after an interval of time. The illustrated time delay relay is of the commercially available type, being driven by a small synchronous motor coupled to a gear train. At the termination of the time delay interval, the contacts of a microswitch close and energize relay 137.

It should be noted at this time that when time delay relay 134 and control autotransformer $T_1$ have been energized, the output of the control autotransformer is applied across the primary winding $P_2$ of step-up autotransformer $T_2$. To limit the peak current, a choke $L_1$ is connected in series with primary winding $P_2$. To furnish a full wave rectified current for charging the capacitors $C_1$, $C_2$ and $C_3$, the pair of high voltage rectifiers $D_1$ and $D_2$ are connected in the secondary circuit of step-up transformer $T_2$.

The secondary winding $W_2$ is in turn tapped at its center tap $M_2$ so that the voltages between each end of the secondary winding $W_2$ is of such polarity that its upper end is positive with respect to the center tap $M_2$, the plate of the high voltage rectifier $D_1$ becomes positive with respect to its cathode. The rectifiers $D_1$ and $D_2$ alternately conduct in conformance with the changing polarity of the input voltage. By connecting a voltmeter V in series with a multiplier resistor $R_1$ across the bank of capacitors, a voltage reading may readily be taken of the voltage level on the capacitor bank.

The full wave rectified output is additionally utilized for the purpose of charging a capacitor $C_4$ through a voltage divider consisting of resistors $R_2$ and $R_3$. Approximately fourth-tenths of the full wave rectified voltage is applied across the capacitor $C_4$. A resistor $R_4$ is connected in the discharge circuit of the capacitor $C_4$ to control its discharge rate when the relay 137 is actuated to the closed position.

The following is a brief description of the way in which the foregoing described energy source of FIGURE 8 may be utilized in the practice of our invention. The adjustable arm 128 on the variable or control autotransformer $T_1$ is initially set to provide a selected voltage between the center point $M_2$ and one end of the secondary winding $W_2$ of the step-up transformer $T_2$. For a bank of capacitors having a capacitance of 615 microfarads previously referred to and a preselected surge of electrical energy of 2,500 joules for effecting complete separation of laminations 11 in FIGURE 1, the arm should be set to charge the bank with a selected voltage of 2,500 volts. With main switch 123 closed and the filament transformers energized for an interval of approximately twenty-five seconds, the grids of the high voltage rectifiers become warmed up. The time delay switch 127 closes, supplying power to leads 124 and 126. The circuit is now in stand-by condition, and the capacitor bank can be charged by the operator at his discretion by depression of the button for switch 51.

Once the capacitors $C_1$, $C_2$ and $C_3$ have been charged to the selected voltage level and the time delay period has terminated, relay 137 causes the capacitor $C_4$ to discharge through the starter rod 138 of ignitron $S_1$. When the ignitron has been triggered into a conductive condition, it funcitons as a switch and discharges the capacitor bank ($C_1$, $C_2$, $C_3$) which directs the preselected energy surge to the excitation winding 21 illustrated in FIGURE 8 through terminal connectors 48 and 49.

When the polarity of the voltage across the terminal connectors 48, 49 reverses, the voltage on the plate of the high voltage rectifier $D_3$ becomes positive, and it is also triggered into conduction. With the rectifier $D_3$ conducting, a positive potential is applied at the starter rod 138 of ignitron $S_2$, which subsequently fires. Consequently, the reverse current flow shunts the capacitor bank.

If successive high energy surges are desired, the adjustable arm 128 on the control autotransformer $T_1$ may be moved to regulate the selected voltage level on the capacitor bank which will give a surge of preselected magnitude. If a time delay interval of greater duration is required than that used for the first surge, time delay control 135 can be adjusted to provide a time interval corresponding to the new voltage level. Pushbutton switch 51 is once again depressed and the capacitors $C_1$, $C_2$ and $C_3$ of the capacitor bank are charged and finally discharged after a prescribed time interval to provide a second high electrical energy surge through the winding coils. This cycle of operation may be repeated for each subsequent surge of energy.

The following, like that respectively given in our copending applications Ser. Nos. 414,822 and 414,824 filed Nov. 30, 1964, now U.S. Patents Nos. 3,333,335 and 3,333,327, is an illlustrative example of components for the energy surge source 50 which may be incorporated in the aforedescribed circuit of FIGURE 8:

| Component identification | Specifications of the components |
|---|---|
| Control autotransformer $T_1$ | General Electric 9H60LA10X. |
| Step-up transformer $T_2$ | Stancor P-8034. |
| Choke $L_1$ | Stancor C-2688, −010 henries. |
| Rectifiers $D_1$, $D_2$, $D_3$ | Mercury vapor rectifiers 872A. |
| Filament transformer $T_3$ | Stancor 5 volt, 15 amperes P-6433. |
| Filament transformer $T_4$ | Stancor 5 volts, 10 amperes P-6135. |
| Ignitrons $S_1$, $S_2$ | GL-5550 ignitron. |
| Capacitors $C_1$, $C_2$, $C_3$ | 210 microfarads, 5000 volts. |
| Capacitor $C_4$ | .05 microfarad, 2000 volts. |
| Resistor $R_1$ | 5 megohms. |
| Resistor $R_2$ | 2 megohms. |
| Resistor $R_3$ | 3 megohms. |
| Resistor $R_4$ | 20 megohms. |

It will be recognized by those skilled in the art, of course, that other types of electrical energy surge sources can and actually have been employed in the practice of the present invention. Whatever the source, it should be capable of applying at least one surge of electrical energy having a magnitude selected for the reasons already given.

Although the principles of our invention have been illustrated advantageously in connection with stator and transformer laminations, it will be apparent to those skilled in the art that the invention may also be effectively used for other elements. It is possible, for instance, to gain the desired separation and reduction in electrical losses in laminated rotor cores and to break away the rotor winding, formed of non-magnetic material; e.g., a squirrel-cage aluminum or copper secondary winding from the magnetic rotor core. As revealed in the preferred embodiments of our invention, the improved methods provide economically efficient and effective solutions to the element separation and electrical core loss problems previously outlined.

It will be apparent that many modifications may be made to the methods disclosed without departing from the present invention. Consequently, it is intended in the appended claims to cover all such equivalent modifications and variations that fall within the true spirit and scope of our invention.

What we claim as new and desire to secure by Letters Patent of the United States is:

1. A method for separating a number of magnetic elements held together in adjacent relation primarily by an interlaminate bond existing between next adjacent elements, the method comprising the steps of: placing at least one electrical conductor in the vicinity of an outer edge of the magnetic elements; generating at least one electrical energy surge in the electrical conductor and establishing a varying magnetic field adjacent the outer edge of a magnitude sufficiently great to achieve the desired separation of the elements but below the intensity which deleteriously affects the elements; and effecting the desired separation of the elements by electromagnetic forces, resulting from the electrical energy surge, created at least in the region of the laminations near the electrical conductor which act to break the interlaminate bonds and to effect separation of the next adjacent elements relative to one another.

2. A method for substantially separating a number of magnetic laminations held together in adjacent relation primarily by an interlaminate bond existing between next adjacent laminations, the method comprising the steps of: placing at least one electrical conductor in the vicinity of an outer edge of the laminations; generating at least one electric current surge in the electrical conductor of a magnitude selected to effect the desired substantial separation of the laminations; and effecting the desired substantial separation of the laminations with the electric current surge creating a varying magnetic field in the region of the laminations near the electrical conductor and producing electromagnetic forces which act to break the interlaminate bonds and to effect the substantial separation of the laminations relative to one another.

3. A method for separating a number of magnetic elements held together in adjacent relation, the method comprising the steps of: surrounding the outer edges of the adjacent elements with electrical conductor means for conducting electrical energy; generating at least one electrical energy surge in the electrical conductor means of a magnitude selected to achieve the desired separation of the elements; and effecting the desired separation of the elements by producing a varying magnetic field and resulting electromagnetic forces created by virtue of the electrical energy surge in at least the regions of the elements near the electrical conductor means which interact with the elements to effect the desired separation thereof.

4. A method for effecting a desired separation of a number of adjacent electrically conductive laminations for use in electrical inductive devices, with the laminations being maintained together in adjacent face to face relation and having an interlaminate bond between at least some of the next adjacent laminations; the method comprising the steps of: placing an outer edge of the laminations surrounding electrical conductor means for conducting electrical energy next to one another; applying at least one electrical energy surge to the electrical conductor means of a magnitude selected to break the effectiveness of the interlaminate bond between next adjacent laminations without damaging the laminations; and effecting the desired separation of next adjacent laminations by the action of a varying magnetic field and electromagnetic forces, resulting from the electrical energy surge, which interact with the next adjacent laminations to break the effectiveness of the interlaminate bonds and produce the desired separation of the laminations, one from another.

5. A method for effecting the complete separation of a number of adjacent magnetic laminations for use in cores of electrical inductive devices, with the laminations being maintained together in adjacent face to face relation primarily by an interlaminate metallic bond existing between next adjacent laminations; the method comprising the steps of: surrounding the laminations with electrical conductors; applying at least one electrical energy surge to the electrical conductors of a magnitude sufficiently high to break the interlaminate bond between next adjacent laminations without causing damage to the laminations; and completely separating next adjacent laminations by the action of the at least one electrical energy surge creating a magnetic field around the laminations and resulting electromagnetic forces which break the interlaminate metallic bonds and produce complete separation of the laminations, one from another.

6. A method for reducing electrical losses in a core, for use in an electrical inductive device, fabricated from a number of magnetic elements rigidly secured together in stacked adjacent relation with an interlaminate bond existing between at least some of the next adjacent laminations, the method comprising the steps of: disposing electrical conducting means for conducting electrical energy next to an outer edge of the core; generating at least one electrical energy surge in the electrical conducting means of a magnitude selected to produce the desired reduction in electrical loss, with the electrical energy surge being below the intensity that will damage the rigid securement of the core, and reducing a varying magnetic field and electromagnetic electrical losses in the core by means of the forces distributed around the outer regions of the core resulting from the at least one electrical surge to adversely affect the interlaminate bonds and to reduce the electrical losses arising from the effectiveness of such bonds.

7. A method for reducing electrical core losses in a dynamoelectric machine core fabricated from a number of magnetic laminations rigidly secured together in stacked adjacent relation with an interlaminate metallic bond existing between at least some of the next adjacent laminations, the method comprising the steps of: surrounding the core with a plurality of electrical coils; generating at least one electrical current surge in the respective coils of a magnitude selected to produce the desired electrical core loss reduction, with the intensity of the electrical current surge being below that which will damage the rigid lamination securement of the core, and reducing the electrical losses in the core by means of electromagnetic forces resulting from the magnetic field established around the core with the electromagnetic forces acting to break the interlaminate bonds and to reduce the electrical losses arising from such bonds.

References Cited

UNITED STATES PATENTS 3,118,220    1/1964    Somerville et al.    29—239

JOHN F. CAMPBELL, *Primary Examiner.*

J. L. CLINE, *Assistant Examiner.*

U.S. Cl. X.R.

29—239, 427, 421